United States Patent [19]

King et al.

[11] Patent Number: 4,547,293
[45] Date of Patent: Oct. 15, 1985

[54] PROCESS FOR REMOVAL OF AMMONIA AND ACID GASES FROM CONTAMINATED WATERS

[75] Inventors: C. Judson King, Kensington; Patricia D. MacKenzie, Berkeley, both of Calif.

[73] Assignee: The United States of America as represented by the United States Department of Energy, Washington, D.C.

[21] Appl. No.: 645,657

[22] Filed: Aug. 30, 1984

Related U.S. Application Data

[63] Continuation of Ser. No. 414,544, Sep. 3, 1982, abandoned.

[51] Int. Cl.⁴ .................. B01D 19/00; B01D 13/00
[52] U.S. Cl. ......................... 210/638; 55/37; 55/70; 210/643
[58] Field of Search ............... 55/37, 70; 210/638, 210/639, 643

[56] References Cited

U.S. PATENT DOCUMENTS

| | | | |
|---|---|---|---|
| 3,620,674 | 11/1971 | Renault et al. | 423/356 |
| 3,649,190 | 3/1972 | Deschamps et al. | 423/356 |
| 3,649,220 | 3/1972 | Powell et al. | 210/638 X |
| 3,676,106 | 7/1972 | Hazen | 210/638 X |
| 3,779,907 | 12/1973 | Li et al. | 210/638 |
| 3,969,265 | 7/1976 | Singhal et al. | 210/643 X |
| 4,029,744 | 6/1977 | Li et al. | 210/638 X |
| 4,064,040 | 12/1977 | Singhal et al. | 210/638 |
| 4,235,713 | 11/1980 | Diaz Nogueira et al. | 210/638 |
| 4,287,071 | 9/1981 | DiGiacomo | 210/643 |
| 4,334,999 | 6/1982 | Cornwell | 210/638 |
| 4,360,448 | 11/1982 | Li et al. | 210/643 X |

OTHER PUBLICATIONS

Cahn et al., "Removal of Ammonium Sulfide from Wastewater by Liquid Membrane Process", Environmental Science & Technology, 12, 1051–1055, (1978).

Primary Examiner—Robert Spitzer
Attorney, Agent, or Firm—Harold M. Dixon; Roger S. Gaither; Judson R. Hightower

[57] ABSTRACT

Contaminating basic gases, i.e., ammonia, and acid gases, e.g., carbon dioxide, are removed from process waters or waste waters in a combined extraction and stripping process. Ammonia in the form of ammonium ion is extracted by an immiscible organic phase comprising a liquid cation exchange component, especially an organic phosphoric acid derivative, and preferably di-2-ethyl hexyl phosphoric acid, dissolved in an alkyl hydrocarbon, aryl hydrocarbon, higher alcohol, oxygenated hydrocarbon, halogenated hydrocarbon, and mixtures thereof. Concurrently, the acidic gaseous contaminants are stripped from the process or waste waters by stripping with steam, air, nitrogen, or the like. The liquid cation exchange component has the ammonia stripped therefrom by heating, and the component may be recycled to extract additional amounts of ammonia.

8 Claims, No Drawings

PROCESS FOR REMOVAL OF AMMONIA AND ACID GASES FROM CONTAMINATED WATERS

The U.S. Government has rights in this invention pursuant to Contract No. DE-AC03-76SF00098 (formerly No. W-7405-ENG-48) between the U.S. Department of Energy and the University of California.

This is a continuation of application Ser. No. 414,544 filed Sept. 3, 1982, now abandoned.

BACKGROUND OF THE INVENTION

This invention relates to processes for the removal of acid and basic gases from contaminated industrial process waters; but more especially to the removal of ammonia and acid gases, such as carbon dioxide and hydrogen sulfide from such industrial process waters.

Many important industrial processes, e.g., petroleum refining, coking effluents from steel processing, and emerging technologies, e.g., coal gasification and oil shale retorting, produce effluents, or recycle water streams wherein ammonia and one or more weak acid gases, e.g., carbon dioxide, hydrogen sulfide, hydrogen cyanide, etc., are dissolved together. Environmental protection regulations require the removal of these dissolved gases before the release of such waters. In other instances, these dissolved gases must be removed before the waters are fit for recycling. In addition, where the volume of these waste or recycle waters is high and the percentage of dissolved gases is substantial, there may be economically worthwhile amounts of these contaminants available for recovery. Thus ammonia is a valuable industrial commodity, as is sulfur, etc. Therefore even without environmental considerations, it may be advantageous to recover these contaminating gases.

In the past, the most common method of recovering the contaminants has been the separation of gases from the waste, or recycle waters, by steam stripping. Unfortunately, however, both the basic ammonia gas and the acidic gases ionize in solution, and the pH stabilizes out to a value typically about 8 to 9. At such pH's both the ammonia and acid gases are substantially ionized. When ionized, the volatility of the gases are substantially reduced. Low volatility greatly increases the steam requirement to effectuate stripping. Boil-up ratios of 0.08 to 0.15 lbs. of steam per pound of water are commonly encountered. In cases where it is desired to isolate the ammonia as a pure product, even more elaborate stripping processes are required. These more elaborate processes further increase the capital costs and add to the steam requirements. Of course, the generation of steam is energy intensive, and increased fossil fuels costs in recent years have sparked interest in techniques for reducing the steam requirements for such processes, or devising other techniques for removing the contaminating gases.

One technique that has been studied for the more efficient removal of basic and acid gases from process waters involves the use of liquid-membrane processes in combination with traditional stripping techniques. For instance, Cahn et al., in Environmental Science and Technology, 12, 1051 Et.seq. (1978), and in U.S. Pat. No. 4,029,744 issued June 14, 1977, describe the removal of weak bases and weak acids by contacting the contaminated solution with a specially devised water-in-oil emulsion. In this technique one of the contaminating species permeates the emulsion's external oil phase and then reacts with a reactant present in the interior phase to produce a neutralized product. This neutralized product effectively removes one of the contaminants and provides a continuing driving force for the further permeation of the emulsion by the one contaminant. Thus one contaminant is effectively removed. At the same time, the other contaminants are continually stripped by conventional steam stripping or air blowing of the feed waters.

Although the liquid-membrane technique shows promise, other energy efficient processes would also be of considerable interest.

SUMMARY OF THE INVENTION

The present invention utilizes a liquid ion exchange material dissolved in a water-insoluble solvent to selectively remove ammonia, more precisely ammonium ion, from contaminated waste or process waters. Removal of the ammonia concurrently decreases the ionization of the acid components. These acid components in the gaseous form may then be removed more easily by conventional stripping techniques.

The simultaneous removal of the basic contaminant by the liquid ion exchange material and the stripping of the acid contaminants by steam or air will be hereinafter referred to as "extripping."

More specifically, it has been found that certain liquid ion exchange materials, when dissolved in suitable organic solvents, have the ability to remove the basic component, i.e., ammonium ion, from contaminated waters. If the liquid ion exchanger is properly selected, the exchanged ammonium ion may be subsequently converted into ammonia gas and removed from the liquid ion exchanger phase. At the same time, the liquid ion exchanger is converted back into its original form and may be recycled to remove additional ammonium ion from the contaminated waters.

An especially preferred liquid ion exchanger is an organic phosphoric acid derivative, specifically di-2-ethyl hexyl phosphoric acid (hereinafter abbreviated D2EHPA). D2EHPA is a cationic ion exchanger that exchanges its hydrogen ion with ammonium ion. Under the proper conditions, the ammonium D2EHPA will release the ammonium ion as ammonia and convert back into the acid form.

While D2EHPA is the preferred ion exchange material, other related organic derivatives of phosphoric acid can also be used. Branched alkyl or alkyl-aryl organic substituents may be used as long as they show a good ability to combine with ammonium ion and they are not excessively soluble in the aqueous phase. Such materials should not adversely affect phase separation, and they should be recyclable.

For use in the inventive process, the liquid ion exchanger is dissolved in suitable organic solvents, e.g., hydrocarbons, water-insoluble alcohols, aromatics, oxygenated hydrocarbons and/or halogenated hydrocarbons, to form a water-insoluble solution. This solution is contacted with the contaminated waters to extract the basic ammonia contaminant.

Upon extraction of the basic contaminant, the acid contaminants are forced back into their unionized molecular forms, and are easily stripped and recovered, if desired.

It is therefore an object of the invention to provide a process for removing the basic contaminants from process and waste waters utilizing a liquid ion exchanger.

It is another object of the invention to remove ammonia from process or waste waters with a liquid ion exchanger and to remove acid contaminants by conventional stripping media.

It is still another object to remove both basic and acidic gases from process waste waters utilizing a combination of liquid ion exchanger and steam or air stripping.

It is still another object of the invention to utilize di-2-ethyl hexyl phosphoric acid as a liquid ion exchange material for removing ammonia from process or waste waters.

It is yet another object of the invention to provide a process to segregate ammonia from acid gases from a source contaminated with both materials.

Additional objects, advantages and novel features of the invention will be set forth in part in the detailed description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Reference will now be made in detail to the preferred embodiment of the invention. More particularly, both ammonia and weak acid gases, e.g. $CO_2$ and $H_2S$, are separated and removed from contaminated process or waste waters in a combined ion exchange-solvent extraction and stripping process.

When both weak base gases and weak acid gases are dissolved in water, the resultant solution commonly stabilizes at pH's in the 8 to 9 range. At these pH's the weak base gases, i.e., $NH_3$, react with protons from the water to form ionized ammonium cations, $NH_4^+$. At the same time, the weak acid gases, e.g., $CO_2$, react with hydroxyl ions from the water to form ionized anions, e.g., $HCO_3^-$. Such cations and anions are not readily available for removal from the aqueous solution by conventional techniques, such as steam stripping. Steam stripping is most effective when the acid and base contaminants are in the un-ionized form; that is when the equilibrium between the ionized and un-ionized species has been forced over to the un-ionized (gaseous) form, thus:

$$NH_4^+ \rightleftharpoons NH_3 + H^+ \quad (1)$$

and $$HCO_3^- \rightleftharpoons CO_2 + OH^- \quad (2)$$

Unfortunately any attempts to influence the equilibrium by pH adjustment to either the stronger acid or stronger base sides results in an increase in the ionization of one species or the other. Thus the stripping process is frustrated and can be achieved only with expenditure of large amounts of energy for steam generation as noted above.

The present process overcomes this difficulty by utilizing the ionization of the basic component to achieve separation and removal. Specifically, an ion exchange solvent phase is provided to extract the ionized basic contaminant and remove it from the contaminated waters. At the time the basic component is extracted, the acid contaminant, being in a more acid environment, has its equilibrium forced to the un-ionized side. In the un-ionized molecular form, the acid contaminant, which is now in the form of a dissolved gas, e.g., $CO_2$, is readily stripped from the contaminated water by steam, $N_2$, or air.

The operation of extracting the ionized basic contaminant, ammonium ion, into the ion exchange-solvent phase; and the steam stripping of the acid gases, is carried out in a simultaneous operation, referred to as "extripping".

Extripping comprises contacting an input feed of the contaminated waters with a water-insoluble solvent phase that contains a liquid cation exchange component. At the same time, steam, air or $N_2$, is bubbled through the mixture to strip away the acid gaseous contaminants that result when the basic contaminant is extracted into the solvent phase.

In order to practice an extripping separation, it is necessary to employ an organic extractant phase. This extractant phase comprises a liquid cation exchanger, ordinarily dissolved in an organic diluent. The selection of the ion exchanger is very important to the success of the operation. For the purposes of the present invention, phosphoric acid derivatives, or sulfonic acid derivatives have been found to be effective. Generally alkyl or aryl substituted phosphoric acid or sulfonic acid, and more specifically di-2-ethyl-hexyl phosphoric acid; and dinonyl naphthalene sulfonic acid have excellent extractive ability for ammonium ion.

However, for a highly efficient extraction process, it is most desirable that the liquid ion exchange extractant be recyclable. If recyclable, the extractant may be utilized to extract the ammonia from the aqueous phase, and the ammonia can then be recovered from the extractant, at which point, the extractant returns to its original form, and can be recycled to extract more ammonia.

Unfortunately, the ammonium-dinonyl naphthalene sulfonic acid reaction is not easily reversed without degradation of the ammonium dinonyl compound. Ammonium dinonyl naphthalene's regenerability is therefore limited, and it is not preferred for use in a fully integrated ammonia extraction process.

On the other hand, di-2-ethyl hexyl phosphoric acid can be quite easily regenerated by heating and stripping of the ammonium salt while it is in the organic solvent. Thus it is more preferred for use in the process of the invention.

Di-2-ethyl hexyl phosphoric acid has the general structure:

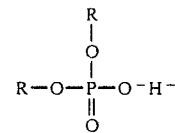

where

D2EHPA is a known compound and it can be purchased on the commercial market from a number of sources. e.g. Mobil Chemical Co. It is a viscous, stable liquid, relatively insoluble in water, but highly soluble in most organic solvents. It reacts with ammonium ion to produce the ammonium salt. The reaction is:

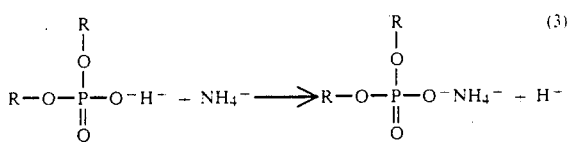   (3)

When the ammonium salt is heated the acid form is regenerated, and ammonia gas is driven off. The reaction is:

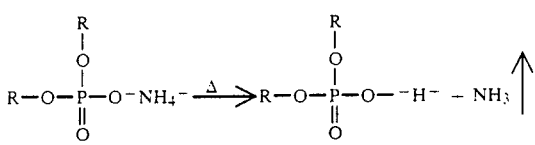   (4)

where

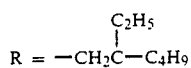

In ammonia contaminated waters and in the presence of weak acid gases, e.g., $CO_2$, the ammonia ionizes by the following reaction:

$$NH_3 + H_2O \rightleftharpoons NH_4^+ + OH^-$$   (5)

The above reaction provides the abundant ammonium ion in contaminated waters. It is this ammonium ion that is extracted by the liquid ion exchanger (D2EHPA) in the process of the invention.

In a companion reaction to the ionization of ammonia to ammonium ion, $CO_2$ also ionizes in the presence of ammonium aqueous solution. The reaction is:

$$CO_2 + H_2O \rightleftharpoons HCO_3^- + H^+ \; (1^{st})$$   (6)

$$HCO_3^- \rightleftharpoons CO_3^{--} + H^+ \; (2^{nd})$$   (7)

In the process of the invention, when the D2EHPA reacts with ammonium ion, hydrogen ion is a product (reaction 3). Thus the hydrogen ion concentration is increased in the aqueous phase and reactions 7 and 6 are driven to the left to increase the $CO_2$ gas concentration. $CO_2$ gas is volatile, whereas ionized $HCO_3^-$ and $CO_3^{--}$ are not volatile, and subsequently the $CO_2$ is readily driven off, or stripped, from the aqueous phase.

The liquid ion exchanger is preferably dissolved in a water immiscible solvent, e.g., alkyl hydrocarbons, higher alcohols, and/or aryl, oxygenated, and chlorinated hydrocarbons. The organic solvent is selected for its water immiscibility, its non-volatility, its influence on phase separation, its effect on the solubility of the liquid ion exchanger in the aqueous phase, effect upon the degree of ammonia extraction, and its fluidity. A combination of solvents may be utilized. For instance, D2EHPA may be dissolved in decanol; or in toluene; or in a mixture of both, or a mixture of alkyl hydrocarbons, e.g., $C_{10}$–$C_{13}$ chains.

It has been determined that the higher alcohols favorably influence phase separation of the aqueous from the organic liquid ion exchange solution. The higher alcohols also favor the extraction of the ammonium ion into the solvent phase, and reduce losses of the D2EHPA and ammonium D2EHPA into the aqueous phase. Therefore, the presence of a higher alcohol in the solvent phase is beneficial.

On the other hand, the D2EHPA and higher alcohols have a relatively high viscosity. This high viscosity is undesirable from a materials handling standpoint. Therefore, it is desirable to reduce the viscosity by adding a quantity of the alkyl hydrocarbons, aryl hydrocarbons or other substances in order to reduce the viscosity of the organic solvent phase and facilitate its handling and mixing during the extraction process and subsequent pumping during processing.

The concentration of D2EHPA in the organic solvent is not critical. However, the upper limit of D2EHPA concentration is governed by viscosity and solubility considerations and good phase separation of the aqueous from the organic phase.

The removal of $NH_3$ and the acid gases from the contaminated waters may be carried out in conventional apparatus. There should be provision for the contacting of the contaminated water and the solvent extraction phase. At the same time there must be provision for contacting with gas stripping medium, e.g., steam.

Suitable vessels must also be provided for the separation of the aqueous and organic phases. A vessel for the subsequent heating of the organic phase and stripping of $NH_3$ therefrom by steam, or other stripping media, air, must also be provided.

Provision can be made for the collection and/or condensation of the effluent gases using apparatus and techniques which are conventional in the art.

Further insight into the invention process and various aspects of the invention will be gained from a review of the following illustrative and non-limiting examples:

EXAMPLE 1

Several experiments were performed to investigate the removal of highly ionized $NH_3$ from aqueous solutions by various solvents. Simple batch extractions were performed wherein the ammonium aqueous solution was thoroughly mixed with a number of water immiscible organic solvents and mixtures of solvents and liquid ion exchangers. The phases were then allowed to separate, and the aqueous phase was analyzed for the presence of $NH_3$.

Batch extractions utilizing methyl isobutyl ketone, 2-ethyl-1-hexanol, 1-decanol, or toluene were ineffective in removing $NH_3$ from the aqueous phase. Similarly carboxylic acids, e.g., 2-ethyl-1-hexanoic acid and neodecanoic acid were ineffectual.

On the other hand, when 18 ml. of an aqueous ammonium solution, 0.38M in $NH_3$ at about pH 9, was mixed with 100 ml. of an organic phase comprising 0.19M dinonyl naphthalene sulfonic acid in $C_{10}$–$C_{13}$ normal paraffin hydrocarbons as the solvent, 95% of the $NH_3$ was extracted into the organic phase.

When 18 ml. of 0.35M $NH_3$ in water at about pH 9 was mixed with 100 ml of an organic phase comprising 0.2M D2EHPA in a $C_{10}$–$C_{13}$ normal paraffin hydrocarbons solvent, 91% of the $NH_3$ was extracted into the organic phase. There was some evidence of a small amount of emulsion at the aqueous-organic interface.

EXAMPLE 2

In another batch experiment, water containing about 0.9% (w/w) ammonia and an approximately stoichiometric equivalent concentration of carbon dioxide was thoroughly mixed with an immiscible solvent phase comprising D2EHPA in about a 10% (w/w) concentration in dodecane. The dodecane/D2EHPA phase was mixed with the contaminated water in a volume ratio of 5:1. Nitrogen was bubbled through the mixed organic and aqueous liquids and passed through both $NH_3$ and $CO_2$ traps. The traps were conventional sulphuric acid traps for the $NH_3$ and NaOH traps for the $CO_2$.

Subsequent analysis of the traps for $NH_3$ and $CO_2$ revealed that the $CO_2$ was removed virtually completely in the $N_2$ stream. On the other hand, essentially no $NH_3$ was removed in the stripping gas. An analysis of the organic extraction phase indicated that about 95% of the ammonia had been extracted from the aqueous. The stripping rate for the removal of $CO_2$ from the aqueous phase was substantially more rapid in the presence of the organic extraction phase than for stripping from an aqueous solution in the absence of the organic extraction phase.

EXAMPLE 3

The selection of the organic solvent for the liquid ion exchange material (D2EHPA) influences both the extraction efficiency of the ion exchange material as well as separation of the organic and aqueous phases.

For instance, when 100 ml of 0.2M D2EHPA in $C_{10}$-$C_{13}$ paraffinic hydrocarbon was contacted with 18 ml of 0.57M $NH_3$, the $NH_3$ concentration in the aqueous phase was decreased by 97%, but a white emulsion zone formed at the aqueous-organic interface. When the hydrocarbon solvent was replaced with toluene and the organic phase was mixed with a similar quantity of the ammonia contaminated water, slightly less ammonia (94%) was removed into the organic phase. However, the formation of an emulsion at the organic-aqueous interface was virtually eliminated.

EXAMPLE 4

A further study was undertaken of the effect of a higher alcohol as solvent for the liquid ion exchange material.

A series of runs were made wherein 18 ml of the aqueous phase having a concentration of 0.57M $NH_3$ was contacted with 100 ml of organic phases having concentration of 0.2M D2EHPA dissolved in various solvents. Specifically where the solvent consisted of 0.17% 1-decanol in toluene a 95.4% reduction of the $NH_3$ concentration in the aqueous was achieved. When the 1-decanol was raised to 11% in toluene, $NH_3$ was reduced by 96% in the aqueous phase. Where the organic solvent comprised 50% 1-decanol in toluene, the ammonia concentration was reduced by 98% in the aqueous phase. Where the organic solvent comprised 100% 1-decanol, 98.5% of the ammonia was extracted into the organic phase.

The ammonium salt of D2EHPA has greatly increased solubility in the aqueous phase as compared with D2EHPA itself. The solubility of D2EHPA in water is about 93 ppm. The solubility of the ammonium-D2EHPA salt is much greater. This increased solubility accounts for the main loss of D2EHPA from the organic phase.

A number of tests were run to study the effect of various organic solvents on the D2EHPA solubility. In each instance 18 ml. of 0.58M $NH_3$ in water was contacted with 100 ml of 0.2M D2EHPA in various solvents and solvent mixtures. This contact produced the ammonium-D2EHPA salt. The aqueous phase was then analyzed for the D2EHPA salt.

Table 1 below sets forth the results:

TABLE 1

| Solvent | $NH_3$—D2EHPA solubility (PPM) |
| --- | --- |
| $C_{10}$-$C_{13}$ hydrocarbon | 4200 |
| Toluene | 1300 |
| 1.8% 1-decanol in toluene | 2500 |
| 6.5% 1-decanol in toluene | 1100 |
| 22% 1-decanol in toluene | 490 |
| 50% 1-decanol in toluene | 260 |
| 100% 1-decanol | 230 |
| 1.6% 1-octanol in toluene | 1900 |
| 12.2% 1-octanol in toluene | 810 |
| 12.2% 2-ethyl-1-hexanol in toluene | 1300 |

Thus higher concentrations of the alcohol in the organic solvent for the liquid ion exchanger material yielded increasing efficiencies in the ammonia extraction from the aqueous phase; and decreased solubility of the ammonium-D2EHPA salt in the aqueous phase.

EXAMPLE 5

The following illustrates a laboratory experiment of the essential process features of the invention.

The aqueous solution was placed in a 3 neck flask. Nitrogen, at a known flow rate, was passed through the solution, stripping out $CO_2$ and/or $NH_3$. The $N_2$ then passed into a series of absorbers. The first absorber contained a known amount of $H_2SO_4$ to absorb $NH_3$ from the $N_2$ stream. An indicator was used to determine when enough $NH_3$ has been absorbed to neutralize the acid. A second absorber in the stream contained a known amount of NaOH to absorb $CO_2$ from the $N_2$ stream. An indicator was used here, also. When an absorber's capacity was reached, it was taken off line and replaced with a new absorber. In this way, the amounts of $CO_2$ and $NH_3$ stripped from the feed solution were monitored as a function of time.

A traditional stripping procedure was accomplished as follows:

An aqueous solution containing 0.56M $NH_3$ and 0.61M $CO_2$ was stripped at room temperature with about 0.68 $ft^3$/hr of $N_2$. After almost 3 hours of stripping, the concentration of $CO_2$ in the aqueous solution was reduced 35% and the concentration of $NH_3$ was reduced 17%. The final solution pH was 9.5.

In a further procedure, a process in accordance with the invention was undertaken as follows:

50 ml of a 0.56M $NH_3$, 0.59M $CO_2$ aqueous phase was contacted with 278 ml of 0.2M D2EHPA in $C_{10}$-$C_{13}$ hydrocarbon diluent. The phases were mixed via a magnetic stirrer. The contents were then stripped with about 0.7 $ft^3$/hr $N_2$ at room temperature. After only 45 minutes, the concentration of $CO_2$ in the aqueous solution was reduced 83%. Analysis of the organic phase indicated it contained about 93% of the $NH_3$. Only 0.5% of the $NH_3$ was stripped by the $N_2$ from the solutions. The final aqueous phase pH was about 6. The combination of stripping and extraction improved the stripping of $CO_2$ and resulted in an almost complete separation of $CO_2$ and $NH_3$.

EXAMPLE 6

The following example illustrates the regeneration of the liquid ion exchanger material. 0.2M D2EHPA in $C_{10}$-$C_{13}$ hydrocarbon as solvent containing about 0.1M NH$_3$ was stripped with N$_2$ at about 0.2 l/min, at various temperatures. After 2 hours of stripping, the NH$_3$ concentration was reduced by 2% at 80° C., 40% at 100° C., and 100% at 200° C. There was no evidence of decomposition and there was no reduction in the extracting power of the D2EHPA.

Attempts to regenerate NH$_3$ loaded dinonyl naphthalene sulfonic acid (DNNSA) by N$_2$ stripping failed. Below 150° C., no NH$_3$ was removed from the organic. Above about 150° C. a solid formed. Analysis of the solid indicated it contained nitrogen.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments were chosen and described in order to explain the principles of the invention and their practical application to thereby enable others skilled in the art to best utilize the invention in various embodiments and with various modifications as are best suited to the particular use contemplated. It is intended that the scope of the invention be defined by the claims.

We claim:

1. In a process for the removal of ammonia and weak acid gases from contaminated water wherein:
   (a) said contaminated water is contacted with an ion exchange agent to combine said ion exchange agent with said ammonia; and,
   (b) said acid gases are concurrently extripped from said contaminated water with a gaseous stripping media;
   (c) the improvement comprising the prevention of the formation of an emulsion of said ion exchange agent with said water by employing the water-insoluble organophosphoric acid as said ion exchange agent and with the further provision that said organophosphoric acid is dissolved in a water-immiscible organic solvent whereby said organophosphoric acid ion exchange agent with said water-immiscible organic solvent forms an organic phase and said contaminated water forms a water phase.

2. A process according to claim 1 wherein said process is further improved by separating and recovering said ammonia from said combination with said water-insoluble organophosphoric acid ion exchange agent and recycling said water-insoluble ion exchange agent freed of said ammonia.

3. A process according to claim 2 wherein said ammonia is separated and recovered from said water-insoluble organophosphoric acid ion exchange agent by:
   (d) separating said organic phase from said water phase; and,
   (e) thermally stripping the organic phase with a gaseous stripping media to remove the ammonia from the combination with said organophosphoric acid ion exchange agent whereby the latter dissolved in said organic solvent is obtained in a form suitable for recycling.

4. The process of claim 3 wherein said water-immiscible organic solvent is selected from the group consisting of alkyl hydrocarbons, aryl hydrocarbons, higher alcohols, oxygenated hydrocarbons, halogenated hydrocarbons, and mixtures thereof.

5. The process of claim 4 wherein said organophosphoric acid is di-2-ethyl hexyl phosphoric acid.

6. The process of claim 4 wherein said organic solvent is decanol.

7. The process of claim 4 wherein said water-insoluble organophosphoric acid ion exchange agent is di-2-ethyl hexyl phosphoric acid and said water-immiscible organic solvent is decanol.

8. The process of claim 7 wherein an alkyl hydrocarbon or aryl hydrocarbon is admixed as a portion of said organic solvent.

* * * * *